United States Patent [19]
Handa et al.

[11] Patent Number: 5,330,028
[45] Date of Patent: Jul. 19, 1994

[54] SADDLE-RIDING TYPE VEHICLE

[75] Inventors: Akio Handa; Tsutomu Takeuchi; Tsuneo Kajikawa; Ikuo Ariga, all of Saitama; Masao Shinada, Tokyo, all of Japan

[73] Assignee: Honda Giken Kogyo Kabushiki Kaisha, Tokyo, Japan

[21] Appl. No.: 960,082

[22] Filed: Oct. 6, 1992

[30] Foreign Application Priority Data

| Oct. 11, 1991 | [JP] | Japan | 3-292480 |
| Oct. 11, 1991 | [JP] | Japan | 3-292481 |
| Oct. 11, 1991 | [JP] | Japan | 3-292482 |
| May 26, 1992 | [JP] | Japan | 4-157330 |

[51] Int. Cl.$^5$ ............................................. B62M 7/00
[52] U.S. Cl. .................................. 180/219; 180/225; 280/281.1
[58] Field of Search .......................... 180/219, 225; 280/281.1, 274

[56] References Cited

U.S. PATENT DOCUMENTS

| 5,012,883 | 5/1991 | Hiramatsu | 180/219 X |
| 5,014,808 | 5/1991 | Savard et al. | 180/219 |
| 5,211,255 | 5/1993 | Fukuda | 180/219 |

FOREIGN PATENT DOCUMENTS 62-258112  11/1987  Japan .
63-309761  12/1988  Japan .
87097       6/1989  Japan .

Primary Examiner—Joseph D. Pape
Attorney, Agent, or Firm—Lyon & Lyon

[57] ABSTRACT

A saddle-riding type vehicle including a simple, lightweight and high rigidity frame structure. The frame structure includes bending upward center pipes 22, which are joined to lower pipes 21 extending backward from the lower portions of a pair of right and left front pipes 20, respectively; connecting the front pipes 20 to the center portions of the center pipes 22 with straight main pipes, respectively; putting front side pipes 25 between the front pipes 20 and the lower pipes 21 for constituting the three-sides of triangles together with the front pipes 20 and the lower pipes 21, respectively; extending seat rail pipes 26 backward from the center portions of the main pipes 24 by way of cross pipes 23 put between the upper portions of the center pipes 22, respectively; and laying reinforcing pipes 27 put between the front side pipes 25 and the main pipes 24 on the same straight lines as those of the seat rail pipes, respectively. A coupling between the exhaust pipe and the muffler is located behind the rear fenders. An air cleaner is positioned beneath the seat and a recessed portion behind the fuel tank receives the suction duct. The fuel tank or other vessel includes hooks on each side with elastic bands extending to right and left frame members supporting the vessel.

7 Claims, 10 Drawing Sheets

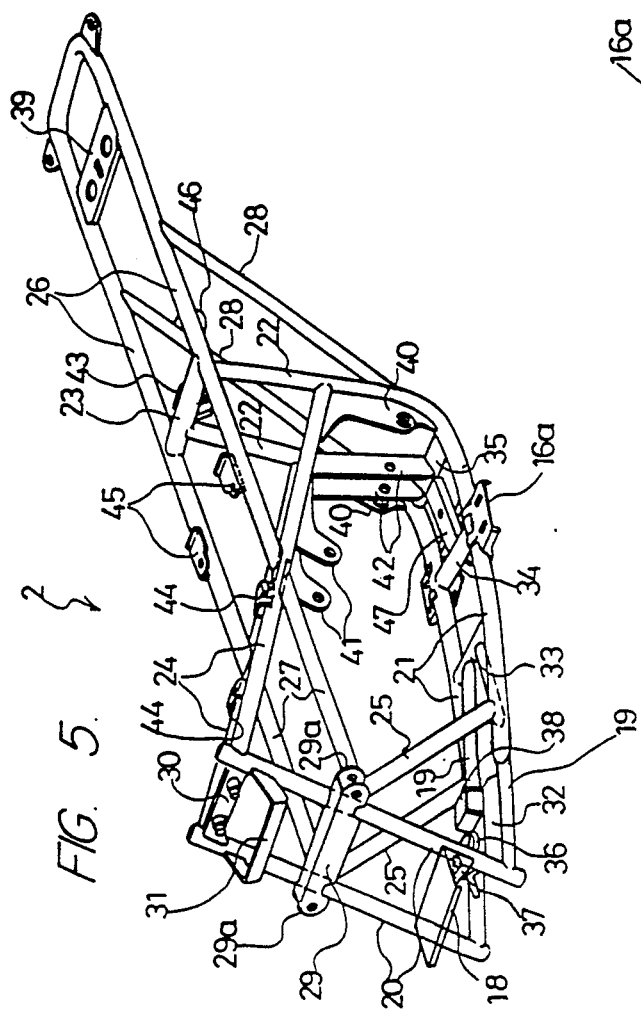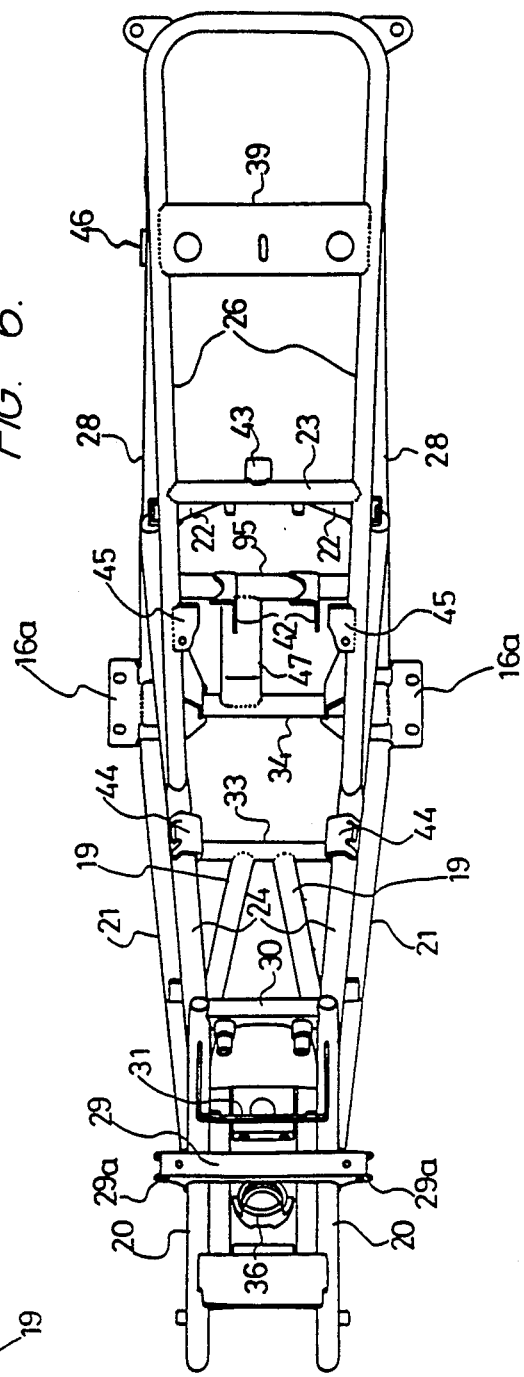

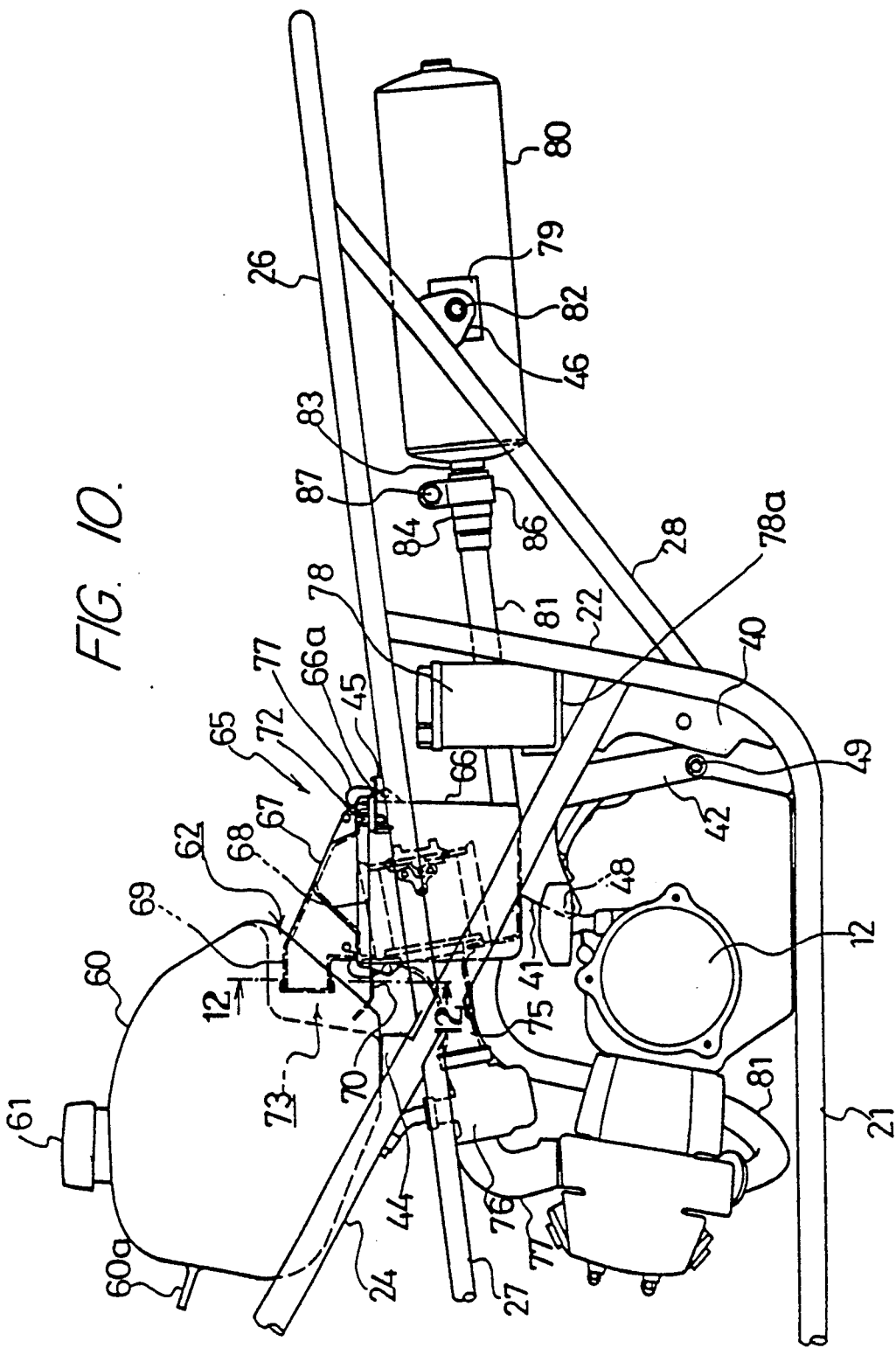

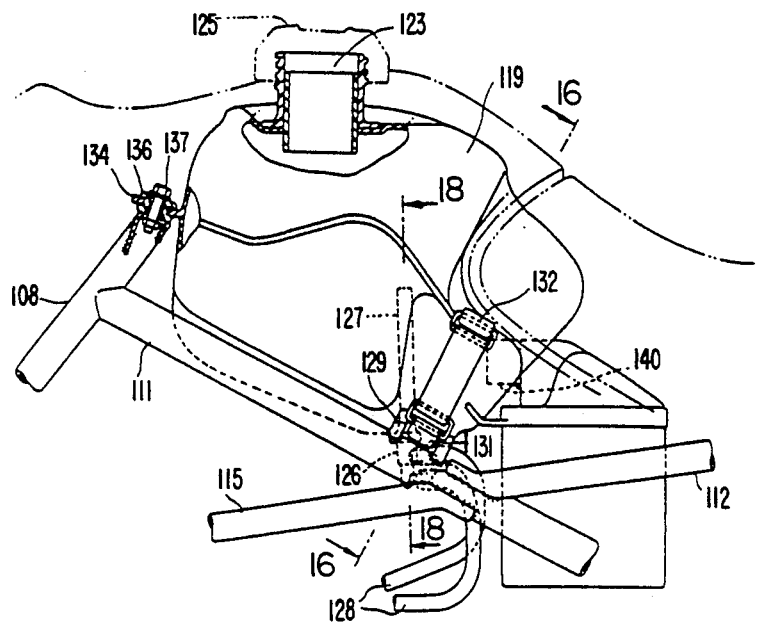
FIG. 14.
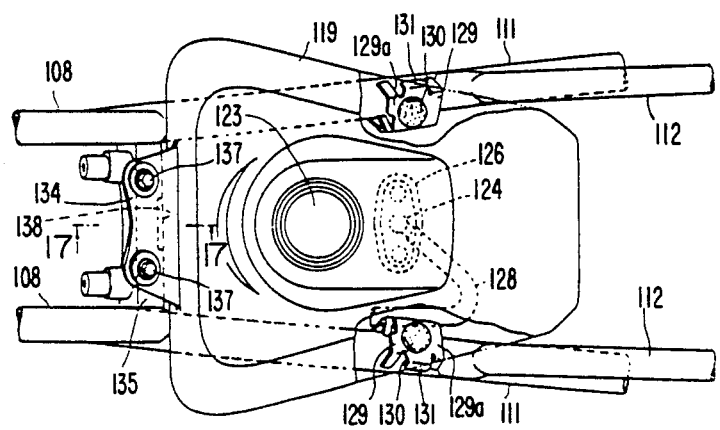
FIG. 15.
FIG. 16.
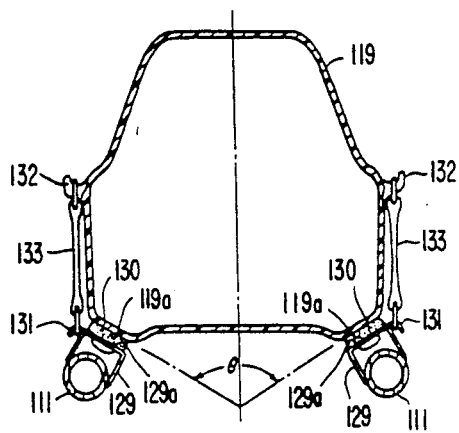
FIG. 17.
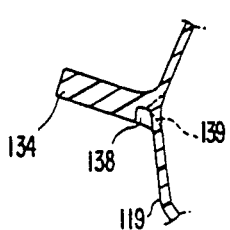
FIG. 18.
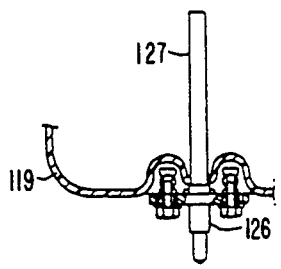

SADDLE-RIDING TYPE VEHICLE

BACKGROUND OF THE INVENTION

The field of the present invention is saddle-riding type vehicles and the structure and component arrangements therefor.

A saddle-riding type vehicle contemplated for use on rough terrain, particularly of a four-wheel variety, requires a high strength vehicle frame. For example, in Japanese Patent Laid-Open Hei 1-87097, a vehicular frame is disclosed, as illustrated herein in FIG. 1. The vehicular frame 01 includes pairs of right and left front frames 03, lower frames 04, center frames 05, seat rails 06 and the like, rather than a large size main frame 02.

This vehicular frame has a three-block structure. A first block includes front frames 03, lower frames 04, reinforcing frames 07 and the like for supporting a front wheel. A second block includes a main frame 02 and center frames 05 for surrounding an engine. A third block includes seat rails 06 and reinforcing stays 08 for supporting a seat. This structure is intended to enhance the rigidity by each block. However, as to the whole structure, stress concentrations occur which are due to longitudinal external forces at the joints between respective blocks. Accordingly, to enhance the whole structure, it is necessary to further employ reinforcing members. This complicates the frame construction and results in increased weight.

A prior air cleaner apparatus of a saddle-riding type vehicle including a fuel tank ahead of a seat is constructed as shown in Japanese Patent Laid-Open Sho 63-309761. A suction duct extends a substantial distance from an air cleaner to under a seat where it is bent and opened. This long suction duct supplies air to the air cleaner apparatus while preventing the permeation of mud, water and the like. The extended suction duct is disadvantageous because it increases cost and weight and also increases engine output loss.

An exhaust of a conventional saddle-riding type vehicle is constructed as shown in, for example, Japanese Patent Laid-open Sho 62-258112, wherein the connecting portion between the exhaust tube and a muffler is disposed ahead of the rear fenders. In such a system, to remove the muffler for repair, exchange, or maintenance/inspection, the rear fenders must first be removed. This can substantially increase the time needed for muffler removal.

In saddle-riding type vehicles, fuel tanks are generally disposed ahead of the seat, supported on the frame members extending in the longitudinal direction. The front end portion and the rear end portion of such fuel tanks are typically connected to these frame members.

For example, a fuel tank of an auto-bicycle disclosed in Japanese Utility Model Hei 1-109489 is provided ahead of a seat over a main pipe extending from a head pipe. The front end portion thereof is engaged with the stay member for connecting a head pipe, a main pipe and a down tube to each other; and the rear end portion thereof is mounted on a vehicular frame by hooking the upper end of an elastic band onto a projection provided on the rear surface of the fuel tank, and hooking the lower end of the elastic band onto a hook provided on the extension portion of the main pipe.

Also, a fuel tank of an auto-bicycle disclosed in Japanese Utility Model Hei 2-147390 is supported on frame members, wherein the front and rear end portions thereof are mounted on the frame members.

Accordingly, it is necessary to provide tank fixtures on the portions of the frame members adjacent to the fuel tank in front of and behind the fuel tank, respectively. Further, in the case of mounting the fuel tank on a pair of right and left frame members, it is necessary to provide a cross member for connecting the right and left frame members to form the tank fixtures. It is impossible to effectively utilize the spaces in front of and behind the fuel tank as the areas for mounting the other members.

For example, it is impossible to dispose an air cleaner usually provided under a seat very close to the rear end of the fuel tank to effectively utilize the space. In the saddle-riding type vehicle, many components must be disposed in the restricted area around the vehicular frame; and therefore, the effective utilization of space becomes important. The above is not limited to the fuel tank but is extended to the other vessels mounted on the frame members. It is desired to mount these vessels on the frame members for disposing other components as close to the front and rear sides of these vessels as possible.

SUMMARY OF THE INVENTION

Taking the above into consideration, the present invention provides a frame structure for a saddle riding vehicle capable of enhancing overall frame strength with simple construction. To this end, the main frame structure, including front, main and center pipes and reinforced forwardly at front suspension systems, has reinforcing pipes and seat rails extending continuously back from the reinforced area, crossing the main pipes to pass fully through the main frame. Consequently, it is possible to enhance the overall frame strength with simple construction and, at the same time, to reduce overall weight.

In another aspect of the present invention, an air cleaner apparatus capable of decreasing cost and weight and of reducing output loss is provided. The air cleaner includes in association with a fuel tank ahead of a seat on a saddle-riding type vehicle, a recessed portion on the lower rear portion of the fuel tank, a suction duct for an air cleaner facing the recessed portion and open thereto and a baffle plate covering the lower portion of the suction duct integrally with an air cleaner case. Since the chamber is formed of the recessed portion of the fuel tank and the baffle plate integrated with the air cleaner case, and the suction duct is provided to face the chamber, it is possible to prevent the permeation of mud, water and the like by the baffle plate, to eliminate the necessity of a long duct, and to reduce cost, weight and engine output loss.

In a further aspect of the present invention, an exhaust capable of facilitating the mounting/demounting of a muffler is contemplated. The exhaust of a saddle-riding vehicle having front and upper portions of the rear wheels covered with rear fenders is provided with a connection between the exhaust tube and the muffler which is positioned rearwardly from the front walls of the rear fenders. The rear fenders do not need to be removed for mounting/demounting the muffler. Thus, the mounting/demounting of the muffler is facilitated. A vessel supporting structure for supporting a vessel such as a fuel tank on a pair of right and left frame members of a saddle-riding type vehicle includes projectingly providing hooks on both the right and left sides of the vessel, respectively, and connecting these hooks onto the right and left frame members with bands, respectively. The vessel may be attached on both sides to the frame members through bands vertically extending along both side surfaces of the vessel, so that it is unnecessary to provide vessel fixtures on the ends of the vessel. Accordingly, spaces are generated at the vessel ends, making it possible to position other devices in the generated spaces.

BRIEF DESCRIPTION OF THE DRAWINGS

FIG. 5 is a perspective view of the frame structure of the device of FIG. 2.

FIG. 6 is a plan view showing the vehicular frame structure shown in FIG. 5.

FIG. 10 is a partial side view of the device of FIG. 2 with the cover omitted.

FIG. 14 is a side view of a fuel tank portion of the four-wheel vehicle of FIG. 13.

FIG. 15 is an upper view of the fuel tank portion of the device of FIG. 13.

FIG. 16 is a cross-sectional view taken along line 16—16 of FIG. 14.

FIG. 17 is a cross-sectional view taken along line 17—17 of FIG. 15.

FIG. 18 is a cross-sectional view taken along line 18—18 of FIG. 14.

DETAILED DESCRIPTION OF THE PREFERRED EMBODIMENTS

Hereinafter, there will be described one embodiment of the present invention with reference to FIGS. 2 to 11.

Figure 1:
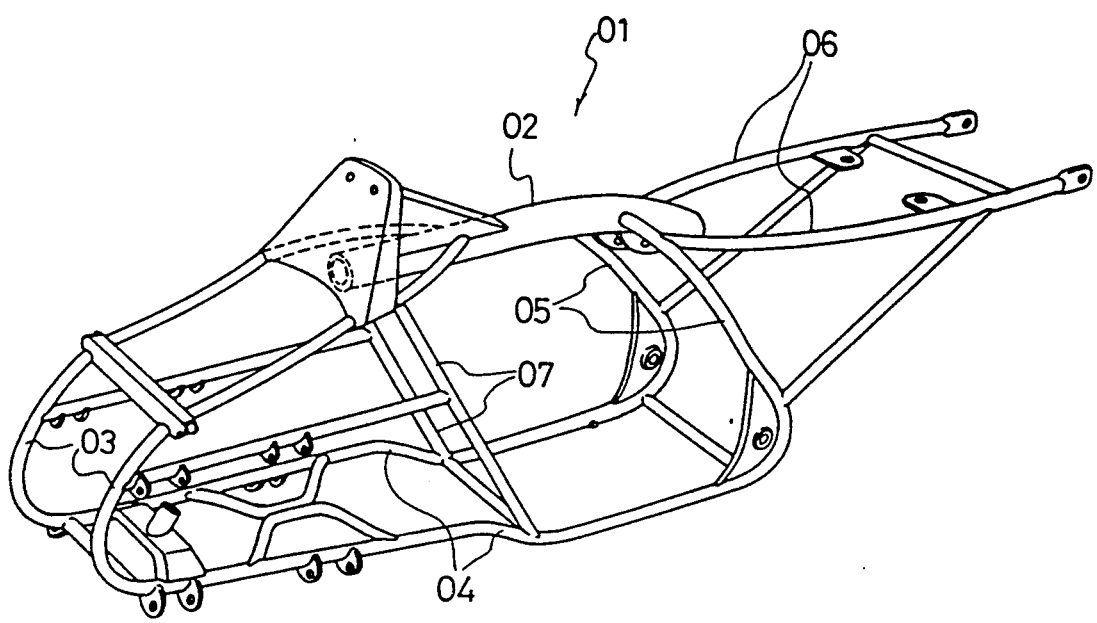
FIG. 1 is a perspective view showing a vehicular frame structure of a conventional saddle-riding type vehicle for rough road running.
Figure 2:
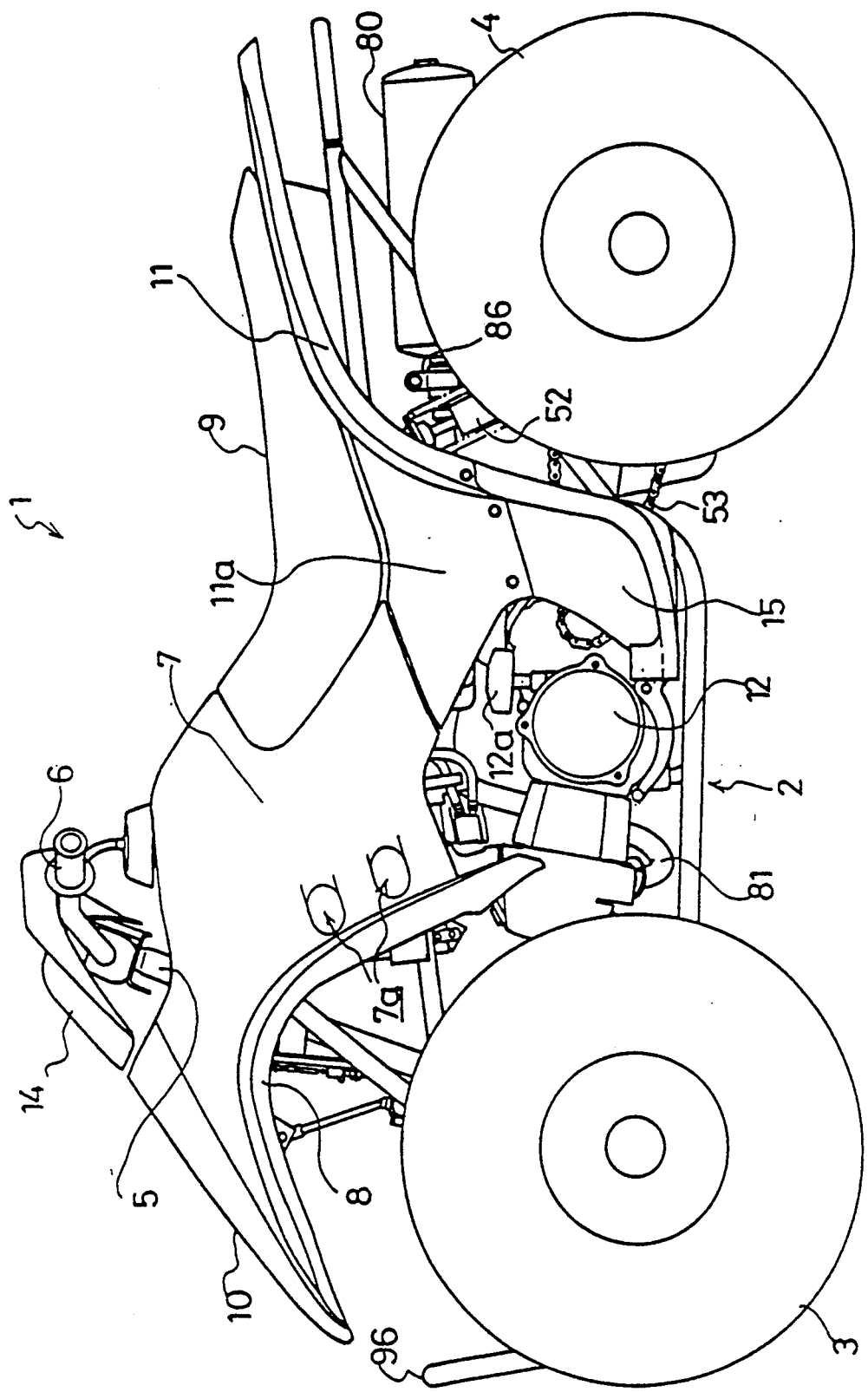
FIG. 2 is a side view of a saddle riding type four-wheel vehicle for rough road running according to one embodiment of the present invention.
Figure 3:
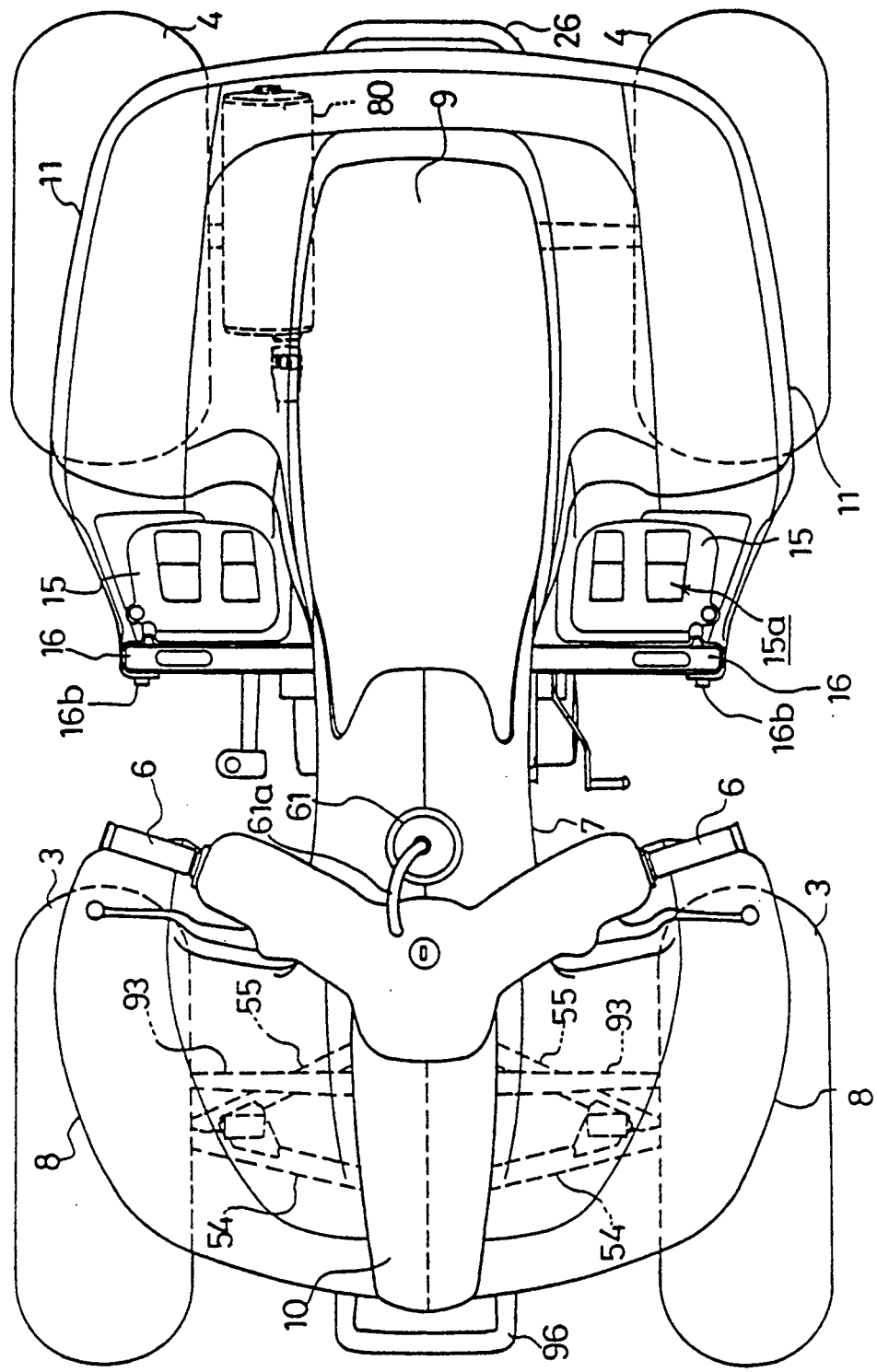
FIG. 3 is a plan view of the device of FIG. 2.
Figure 4:
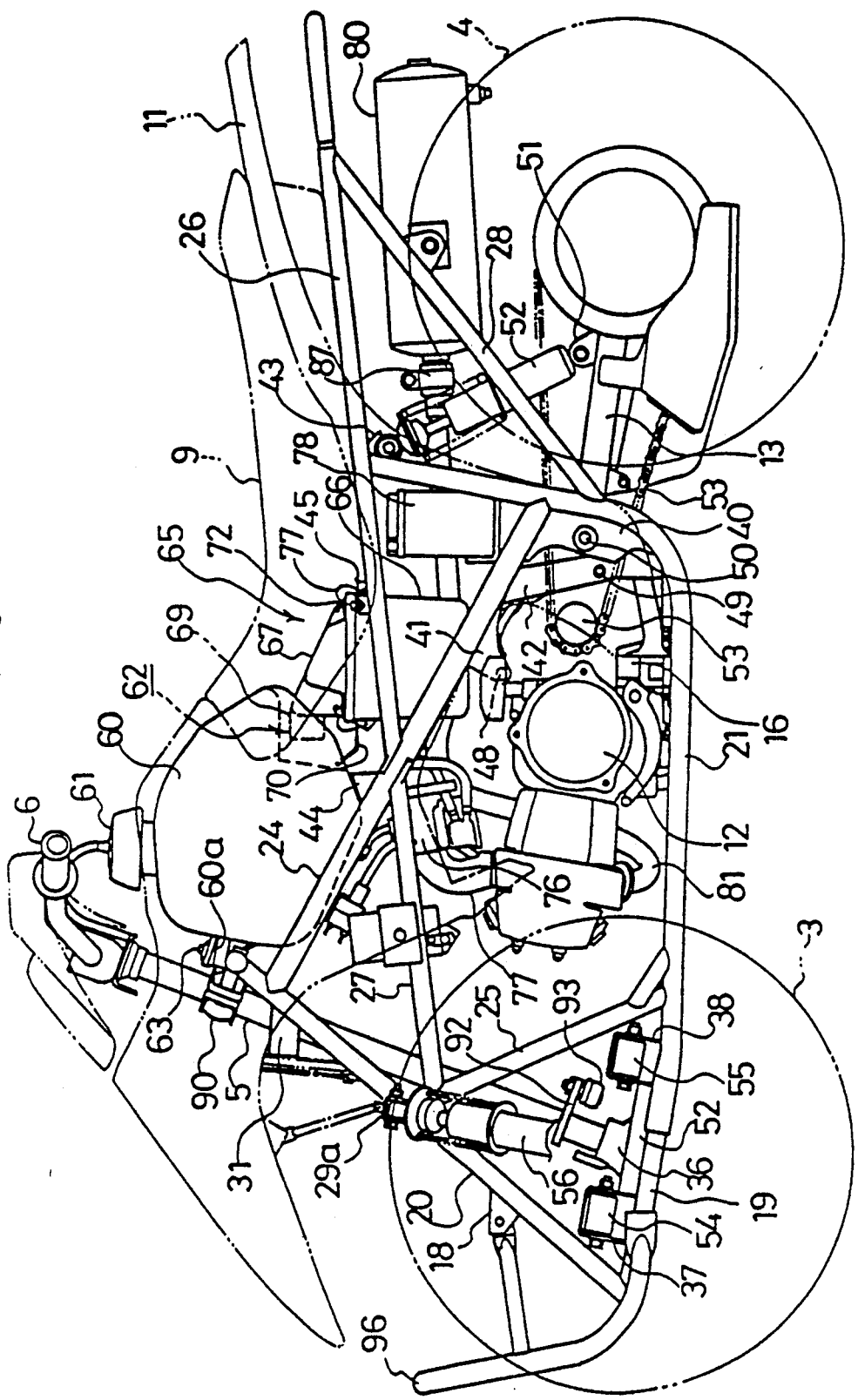
FIG. 4 is a side view of the device of FIG. 2 with the cover shown in phantom.
Figure 8:
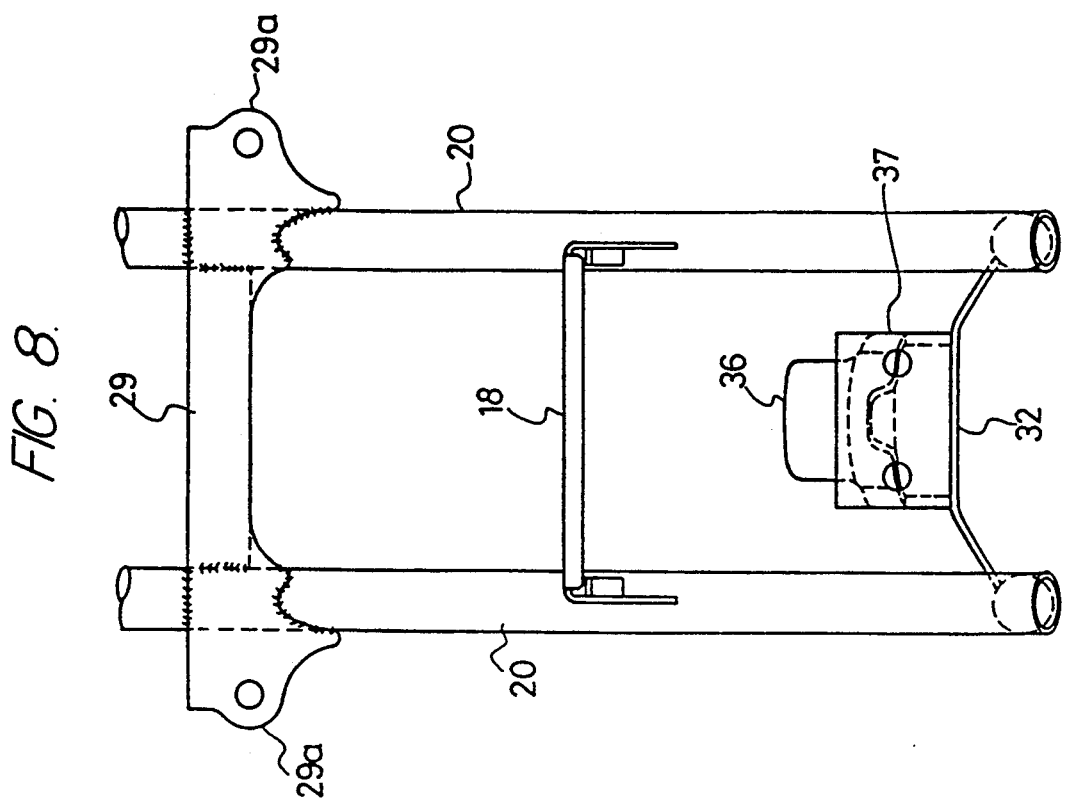
FIG. 8 is a front view showing the vehicular frame structure shown in FIG. 5.
Figure 7:
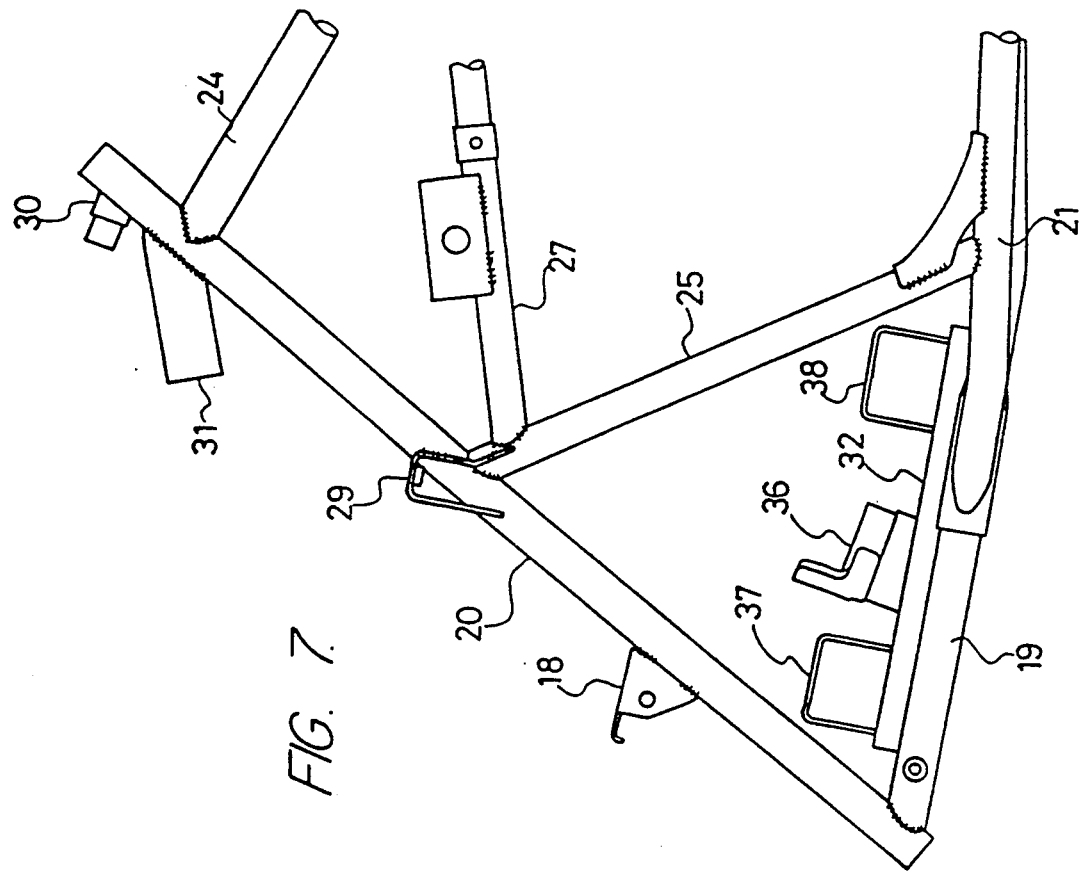
FIG. 7 is a side view showing a front section of the vehicular frame structure shown in FIG. 5.
Figure 9:
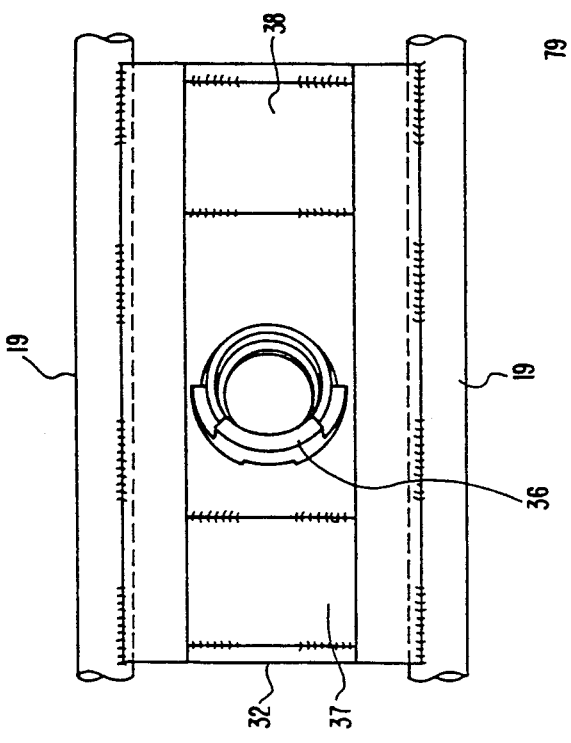
FIG. 9 is a partial plan view showing the vehicular frame structure shown in FIG. 5.
Figure 11:
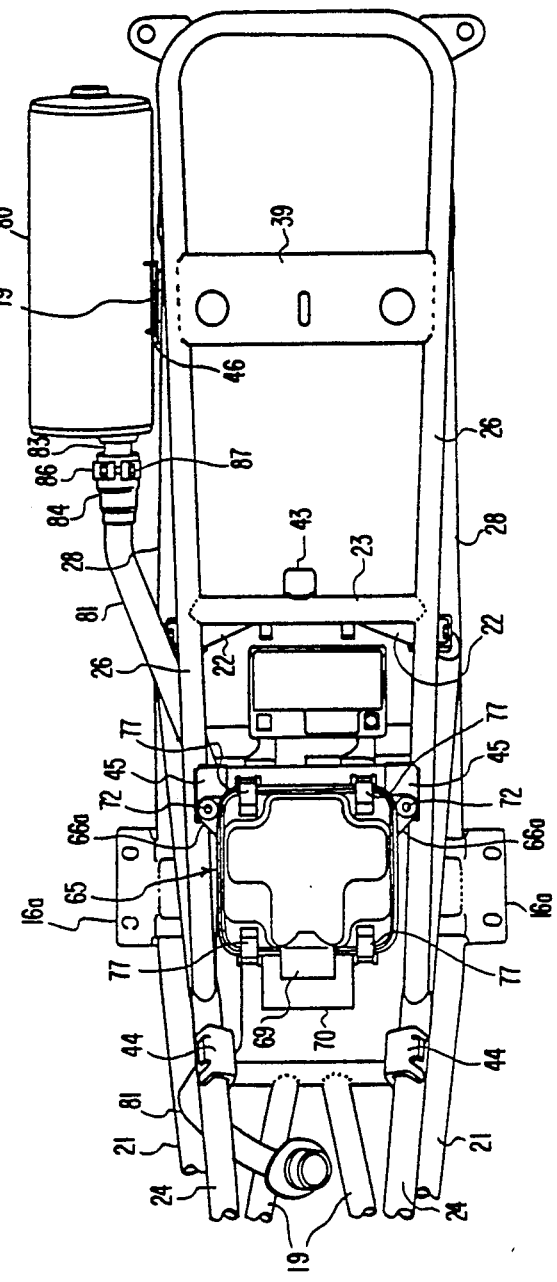
FIG. 11 is a partial plan view of the device of FIG. 2 with the cover, the seat and the fuel tank omitted.
Figure 12:
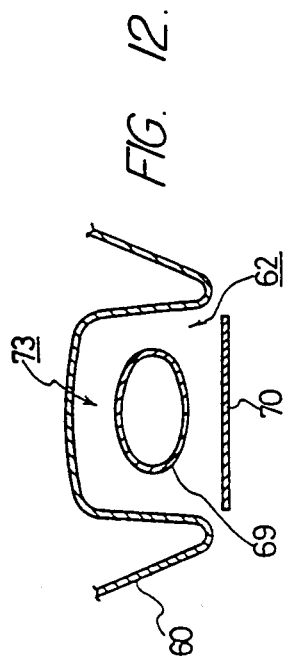
FIG. 12 is a cross-sectional detail taken along line 12—12 of FIG. 10.

This embodiment relates to a saddle-riding type automatic four-wheel vehicle 1 for rough road running. FIG. 2 is a side view showing the whole construction of the automatic four-wheel vehicle 1, and FIG. 3 is a plan view of FIG. 2.

Pairs of right and left front wheels 3 and rear wheels 4 are provided in front of and behind a vehicular frame 2 positioned sideways at the center of the figure while extending from both sides of the vehicular frame 2, respectively.

A steering column 5 is inserted through the front portion of the vehicular frame 2, and bar-handles 6 spread out right and left from the upper end of the steering column 5, respectively.

Side covers 7 cover the right and left side surfaces of the upper portion of the vehicular frame 2, and front fenders 8 spread out right and left from the lower edges of the side covers 7 to the upper portion of the front wheels 3.

In the right and left side covers 7, the front portions surround the front of the steering column 5 and join to each other at the center. The joined portion is covered with a front cover 10. Air vent openings 7a are formed on each side cover 7 near each front fender 8. A handle cover 14 covers the portion extending from the upper end of the steering column 5 to the bar-handles 6.

The upper-rear sides of the right and left side covers 7 extend upward, and are joined to each other at the center. A seat 9 is disposed at the back of the joined portion.

Rear fenders 11 project sideways from the lower edges of both sides of the seat 9 for covering the upper portions of the rear wheels 4, respectively. The right and left rear fenders 11 extend around the rear side of the seat 9, and are integrated with each other.

The inner edges of the right and left rear fenders 11 extend under the side portions of the seat 9, and are abutted on the side covers 7 with the same surface height, respectively. Rear mud guards 15 extend downwardly while being joined to the lower ends of the extending portions 11 and the curved lower end portions of the rear fenders 11, respectively.

The lower end of each rear mud guard 15 is curved outwardly to be thus approximately horizontal for covering each step bar 16 projecting right and left while binding it from the lower side, and is screwed to the step bar 16 by a bolt 16b, thus covering the side of the step bar 16.

Two of rectangular holes 15a are formed on a horizontal portion of the rear mud guard 15, recessed portions being formed on the back thereof, respectively.

The structure of the vehicular frame 2 will be explained in detail with reference to FIGS. 4 to 9.

A pair of right and left front pipes 20 are disposed on the front side of the vehicular frame 2 extending almost obliquely back and forth. Front pipes 19 extend almost horizontally backwardly from the lower ends of the right and left front pipes 20 and curve inwardly as well, respectively. Lower pipes 21 extend backwardly from the outsides of the above curved portions while being joined to the front lower pipes 19, and are bent upwardly at the rear end portions thereof to thus form center pipes 22, respectively. The lower pipes 21 are integrated with the center pipes 22, respectively. A cross pipe 23 is provided so as to connect the upper ends of the right and left center pipes 22 to each other. Straight main pipes 24 are put between the upper end portions of the front pipes 20 and the center portions of the center pipes 22, respectively. Front side pipes 25 are put obliquely downwardly between the center portions of the right and left front pipes 20 and the lower pipes 21, respectively. Thus, there are formed respective triangles having the three sides of the front pipe 20, the lower pipe 21 (partially including the front lower pipe 19) and the front side pipe 25.

Seat rail pipes 26 are welded at the front ends to the center portions of the main pipes 24, passing through both ends of the cross pipe 23 at the upper ends of the center pipes 22, and extend linearly backwardly with the rear ends being oblique a little higher than the horizontal line, respectively.

In addition, seat rail pipes 26 are paired right and left, and connected to each other at the rear ends thereof.

Reinforcing pipes 28 connect the seat rail pipes 26 extending backward from the center pipes 22 with the lower portions of the center pipes 22 for reinforcing them.

Reinforcing pipes 27, each being welded at both ends between the upper portion of the front side pipe 25 and the center portion of the main pipe 24 for connecting them, are disposed on the same straight lines of those of the seat rail pipes 26, respectively. The above frame pipes 19, 20, 21, 22, 24, 25, 26, 27 and 28 are paired right and left, respectively.

A cross plate 29 formed in a U-shape in section is put between the right and left front pipes 20 at the connection portion with the front side pipes 25. Both the ends of the cross plate 29 project outwardly from the right and left front pipes 20 thus forming attachment portions 29a for attaching upper ends of front cushions 56 described later, respectively. In the cross plate 29, the lower ends of rear and front walls of the cross plate 29 are partially cut-out to be welded to the front pipes 20, and the lower ends outside the cut-out of the rear wall are bent along the front side pipes 25 to be welded to the front side pipes 25, respectively.

A cross-stay 30 is put between the upper portions of the front pipes 20. In the same manner, a cross plate 31 is put immediately downwardly of the cross stay 30. Also, a bumper attaching bracket 18 is put between the lower portions of the front pipes 20.

A cross plate 32 is put between the right and left lower pipes 21 ahead of the lower ends of the front side pipes 25, and cross pipes 33, 34 and 35 are sequentially provided at the back of the cross plate 32. A lower steering holder 36 is provided on the cross plate 32, and bearings 37 and 38 for pivotably supporting arm members 54 and 55 adapted to support the front wheels are also provided on the cross plate 32 back and forth of the lower steering holder 36, respectively. A plate 47 for supporting an engine is provided between the cross pipes 34 and 35.

The rear half portions of the front lower pipes 19 curved inwardly are welded at the rear ends to the cross pipe 33. Brackets 16a for attaching the step bars 16 project right and left from the cross pipe 34, respectively. Further, positioned between the right and left seat rail pipes 26 are a cross pipe 23 and, at the back thereof, a cross plate 39, respectively.

The vehicular frame 2 is so constructed as described above, and is enhanced in the rigidity of the whole structure by linearly connecting a high rigidity triangular front section composed of the front pipes 20, the lower pipes 21 and the front side pipes 25 to a rear section with the reinforcing pipes 27 and the seat rail pipes 26 while crossing the main pipes 24.

Brackets 40 for pivotably supporting a rear fork are respectively provided on the center pipes 22 extending from the connecting portion with the main pipes 24 to the lower end bent portions thereof. Brackets 41 for suspending an engine, and brackets 42 through cross pipes 95 are hung from the main pipes 24, respectively.

A bracket 43 for supporting the upper end of a rear cushion 12 is provided on the center portion of the cross pipe 23. Brackets for supporting a fuel tank are respectively provided on the main pipes 24 ahead of the connecting portions with the seat rail pipes 26, and brackets for supporting an air cleaner case are respectively provided on the seat rail pipes 26 behind the above connecting portion.

A bracket 46 for supporting a muffler is provided on the right reinforcing pipe 28 so as to project obliquely downwardly.

In addition, bumper pipes 96 project ahead from the leading edges of the front lower pipes 19 so as to be curved obliquely upwardly, respectively.

In the above vehicular frame 2, an engine 12 is disposed on a plate 47 between the main pipes 24 and the lower pipes 21, and fixed thereto by bolts from the lower sides, and also rigidly supported to the brackets 41 and 42 by flange bolts 48 and 49, respectively.

In addition, a recoil knob 12a is provided on the left side portion of the engine 12.

The rear end of the rear fork 13 is supported on the brackets 40 by a pivot 50 for freely swinging up and down the rear wheels 4 rotatably supported at the rear end of the rear fork 13. The rear cushion 52 is interposed between a bracket 51 projecting from the central upper surface of the rear portion of the rear fork 13 and the above cross pipe 23.

A chain 53 is provided between a sprocket fitted to an output shaft 53 of the engine 12 and a sprocket provided on an axle shaft between the rear wheels 4 for power transmission.

Arm members 54 and 55 project right and left from bearings 37 and 38 provided on the cross plate 32 in the front section while being pivotably supported at the base ends thereof, respectively. The leading edges of the arm members 54 and 55 capable of swinging up and down are united for supporting the axle shaft between the front wheels 3, respectively.

Front cushions 56 are respectively interposed between the leading edge united portions of the right and left arm members 54 and 55 and the attachment portions 29a projecting right and left from the cross plate 29.

The cross plate 29 pivotably mounts the upper ends of the front cushions 56. The cross pipe 23 pivotably mounts the upper end of the rear cushion 52. The reinforcing pipes 27 and the seat rail pipes 26 linearly pass through the vehicular body in the longitudinal direction and connect the plate 29 with the pipe 23. Therefore, it is possible to mutually cancel the load in the longitudinal direction of the vehicle by the front cushions 56 and the rear cushion 52 through the reinforcing pipes 27 and the seat rail pipes 26.

The steering column 5 passes through a space between the cross stay 30 and the cross plate 31 in front of the cross stay 30. The upper portion of the steering column 5 is fixed on a steering upper holder 90 attached to the cross stay 30, and the lower end of the steering column 5 extending obliquely downward is fixed on a lower steering holder 36 at the center of the cross plate 32. In addition, the rotation of the steering shaft is transmitted to right and left tie rods 93 through a center arm 92 for changing the steering angles of the front wheels 3.

A fuel tank 60 is disposed on the upper sides of the front halves of the main pipes 24. A bracket 60a projecting from the front surface of the fuel tank 60 is fixed on the cross stay 30 provided at the upper ends of the front pipes 20, and the right and left sides of the lower surface of the fuel tank 60 are rigidly fixed on the bracket 44 provided on the main pipes 24. Thus the fuel tank 60 is supported.

The fuel tank 60 has an oil filler port at the upper end, and is covered with a cap 61 from which a breather tube 61a is extended. In addition, a recessed portion 62 is formed at the center of the rear half portion of the fuel tank 60.

An air cleaner apparatus 65 is disposed obliquely downward at the back of the fuel tank 60. The air cleaner apparatus 65 is formed by covering the upper opening of the air cleaner case 66 with a lid 67, pushing the lid 67 with a set spring 77, and containing an element 68 therein. In addition, a very short suction duct 69 projects ahead from the lid 67.

The air cleaner case 66 is supported by fixing brackets 66a projecting right and left at the rear portion of the peripheral edge of the opening of the air cleaner case 66 to the brackets 45 provided on the seat rail pipes 26 by bolts 72, respectively. Consequently, the suction duct 69 projecting from the lid 67 is provided in such a manner as facing to the recessed portion 62 provided on the rear half portion of the fuel tank 60.

A baffle plate 70 projects ahead from the front portion of the peripheral edge of the opening of the air cleaner case 66. The recessed portion 62 of the fuel tank 60 is partitioned by the baffle plate 70, thus forming a chamber 73. A suction duct 69 is disposed in the chamber 73 with the front side thereof being open. By use of the suction duct 69 having a very shortened size, it is possible to reduce the weight and the cost, and to reduce the engine output loss. Also, the opening of the suction duct 69 lies in the chamber 73, and is thus prevented from permeation of mud, water and the like by the baffle plate 70.

A duct 75 connected to the clean side of the element 68 is extended from the front surface of the air cleaner case 66 and is connected to a carburetor 76. A suction tube 77 extends from the carburetor 76 and is connected to the suction port of the engine 12.

A battery 78 is disposed at the back of the air cleaner apparatus 65 while being supported by a supporting stay 78a.

Meanwhile, a muffler 80 of an exhaust is formed into a cylindrical shape, and includes an attachment bracket 79 projecting from the left side surface. The muffler 80 is brought in contact with the right reinforcing pipe 28 from the outside, and is supported by lapping the attachment bracket 79 on the bracket 46 of the reinforcing pipe 28 and screwing them by a bolt 82. The muffler 80 thus supported, is positioned at the back of the center pipe 22 inside the right rear wheel 4.

An exhaust tube 81 extends downwardly from the lower surface of a cylinder head 12a directly ahead of the engine 12, immediately curving to the right and then extending upwardly, and then backwardly under the crossing portion to the main pipe 24 at the front end of the right seat rail pipe 26. It further extends along the left seat rail pipe 26, backwardly while being supported by the bracket provided on the main pipe 24 and extends while being gradually deflected to the right to be thus connected to the muffler 80.

An introducing tube 83 slightly projecting from the front wall of the muffler 80 is inserted in a connection tube 84 attached on the rear end of the exhaust tube 81 through a gasket. Subsequently, a fastening band 86 is wound around the connection tube 84 and both the end portions thereof are fastened and connected to each other by a bolt 87. The connecting portion is positioned at the back of the wall portion covering the front portion of the rear wheel 4 of the right rear fender 11.

Accordingly, in the case of mounting/demounting the muffler 80, it is unnecessary to remove the rear fender 11, which makes assembly and maintenance easy.

As described above, the vehicular frame 2, mounting various devices, has a construction of linearly connecting a high rigidity triangular front section composed of the front pipes 20, the lower pipes 21 (partially including the front lower pipes 19), and the front side pipes 25 to the rear section by the reinforcing pipes 27 and the seat rail pipes 26. Therefore, it is possible to enhance the whole strength of the vehicular frame.

The reinforcing pipes 27 and the seat rail pipes 26 lie on the straight line connecting the load point at the upper ends of the front cushions 56 to the load point at the upper end of the rear cushion 52. Further, the main pipes 24 crossing the reinforcing pipes 27 and the seat rail pipes 26 linearly connect the load point of the steering upper holder 90 to the load point of the pivot 50 at the front end of the rear fork 13.

Thus, since all of the frame pipes are effectively disposed linearly between the longitudinal load points, it is possible to keep a high rigidity even with lightweight frames.

The front section is obtained by assembling the frame pipes in triangular shapes, and disposing pipes linearly from the front section to the rear section. Therefore, it is possible to enhance the whole strength with a simple and lightweight frame structure.

By setting the load points of the front cushions and the rear cushion before and after the reinforcing pipes and the seat rails disposed linearly in the longitudinal direction, it is possible to cancel the loads in the longitudinal direction of the vehicle by the cushions, and to achieve the effective frame construction.

As also described above, the air cleaner 65 is disposed on the upper side of the engine and the suction duct 69 lies in the chamber 73 partitioned by the baffle plate 70 while facing the recessed portion 62 of the lower portion behind the fuel tank 60. By this arrangement, it is possible to prevent the permeation of mud, water and the like and to shorten the suction duct 69, reducing weight and cost and realizing a reduction in engine output losses.

Hereinafter, there will be described such an embodiment as applying the present invention to a saddle-riding automatic four-wheel vehicle for rough road running. In this embodiment, the present invention is applied to a structure for supporting a fuel tank.

Figure 13:
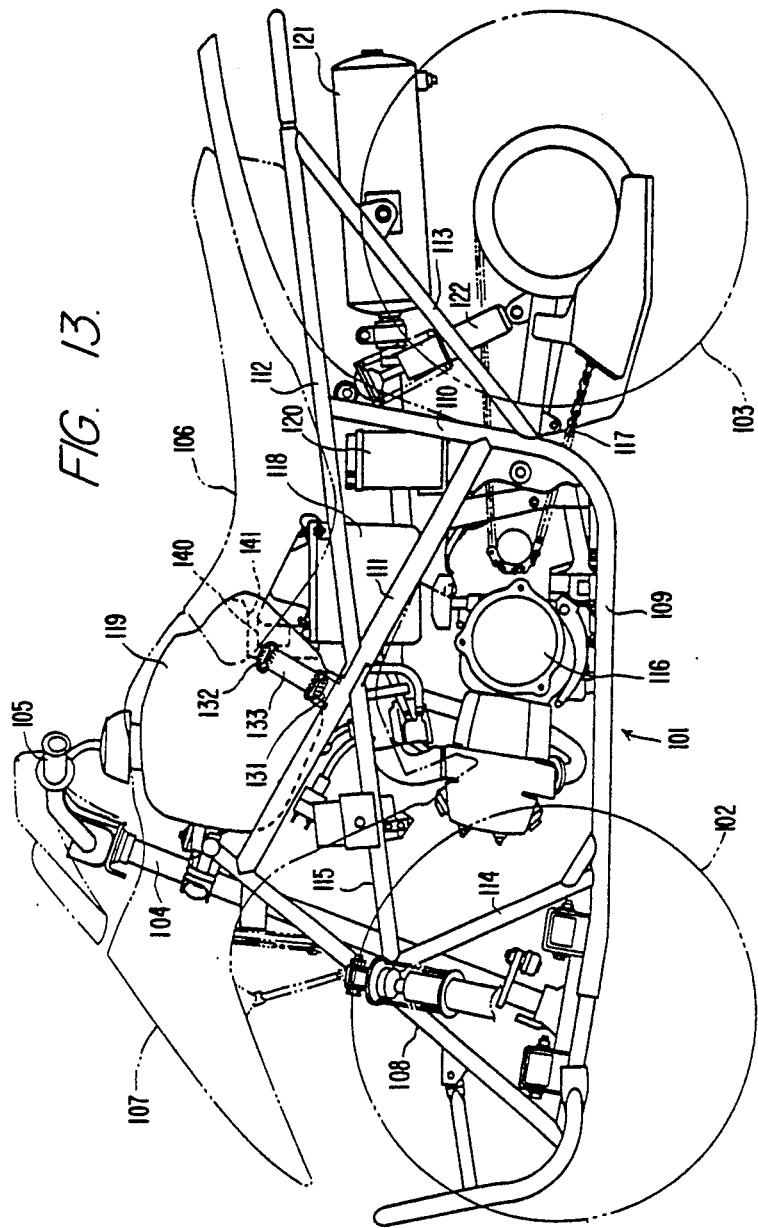
FIG. 13 is a side view of a saddle-riding type four-wheel vehicle for rough road running according to a second embodiment of the present invention with the cover and seat shown in phantom.

FIG. 13 is a side view showing the whole construction of the above automatic four-wheel vehicle. Pairs of right and left front wheels 102 and rear wheels 103 are provided on the front and rear sections of a vehicular frame 101 while extending outwardly, respectively. A steering shaft extends downwardly in the front section of the frame 101 at the crosswise center portion, and a handle 105 is provided at the upper end of the steering shaft 104. A seat is mounted on the rear upper portion of the frame 101. Numeral 107 indicates a cover for covering the body extending from the front surface portion to both sides.

A pair of right and left front pipes 108 are erected obliquely back and forth in the front section. Lower pipes 109 connected to the lower ends of the front pipes 108 extend backwardly approximately in the horizontal direction, respectively. The rear portions of the lower pipes 109 are bent to form center pipes 110, respectively. Also, the intermediate portions of the center pipes 110 are connected to the upper end portions of the front pipes 108 with straight main pipes 111, respectively.

Seat rail pipes 112 connecting the intermediate portions of the main pipes 111 to the upper end portions of the center pipes 110 extend backwardly approximately in the horizontal direction, respectively. Stay pipes 113 are provided between the rear end portions of the seat rail pipes 112 and the lower portions of the center rail pipes 112, respectively. The above seat 106 is supported on the seat rail pipes 112. Further, the lower pipes 109 and the main pipes 111 are reinforced with reinforcing pipes 114 connecting the intermediate portions thereof to the intermediate portions of the front pipes 108, respectively.

As shown in FIG. 15, the above pipes 108 to 115 constituting the frame 101 are respectively paired-up on both sides of the body, and are suitably connected to each other by the cross members.

As seen from the side, an engine 116 is supported by the frame 101 in such a space as being surrounded by the lower pipes 109, center pipes 110, main pipes 111 and reinforcing pipes 114 and 115. The rear wheels 103 are driven by the engine 116 through a chain 117. An air cleaner 118 for intaking air supplied to the engine 116 and cleaning it is disposed on the rear upper side of the engine 116, or on the front lower side of the seat 106.

The air cleaner 118 is supported on the frame 101 in the vicinity of the connecting portions between the seat rail pipes 112 and the main pipes 111. A fuel tank 119 is supported on the main pipes 111 of the frame 101 ahead of the air cleaner 118.

Various devices and members such as a battery 120, a muffler 121, and a rear cushion 122 other than the above air cleaner 118 and the fuel tank 119 are mounted on the frame 101. Accordingly, in order to dispose these devices and members at the suitable positions, it is desired that the air cleaner 118 is provided as close to the fuel tank 119 as possible using the space at the back of the fuel tank 119. Accordingly, the structure for supporting the fuel tank 119 on the main pipes is so constructed to make it possible to effectively utilize the space at the back of the fuel tank 119 for the installation of the air cleaner 118.

The fuel tank 119 is composed of a synthetic resin, and is rigidly mounted on the right and left main pipes 101 while striding over them, as shown in FIGS. 15 and 16. The fuel tank 119 is provided with an oil filler port 123 and an oil supply port 124 on the upper wall and the bottom wall in the cross direction center portion, respectively. The oil filler port 123 is positioned at the highest point of the front side of the upper wall, and is attached with a cap 125. The oil supply port 124 is positioned at the lowest point of the rear side of the bottom wall, and is attached with a supply port piece 126. A strainer 127 connected to the supply port piece 126 extends in the tank (see FIG. 18). The fuel in the tank passes through the strainer 127, and is fed to an oil feed pipe 128 connected to the oil supply port piece 126. The other end of the oil feed pipe 128 is connected to a carburetor of the engine 116. The strainer 127 is disposed on the flat bottom plate of the tank, and thereby the residue of the fuel impossible to be used can be reduced.

Mounting seats 129 for mounting the fuel tank 119 are fixed on the right and left main pipes 111, respectively. The mounting seats 129 have the flat upper surfaces 129a, respectively. The upper surfaces 129a are inclined symmetrically at an angle $\theta$ to the inside in the cross direction. Meanwhile, on the bottom wall, right and left mounting surfaces 119a inclined to each other at an angle $\theta$ as the above upper surfaces 129a are formed at the positions corresponding to the mounting seats 129, respectively.

The fuel tank 119 is mounted on the mounting seats 129 while mounting rubbers 130 are interposed between the mounting surfaces 119a and the upper surfaces 129a of the mounting seats 129, respectively.

Hooks 131 are provided on the right and left mounting seats 129 while projecting outwardly and being bent downwardly, respectively. Further, hooks 132 are integrally formed on both sides of the fuel tank 119 while projecting outwardly and being bent upward at the upper positions of the hooks 131, respectively. Elastic bands 133 are hooked between the hooks 131 and 132, respectively. The fuel tank 119 is pushed to the mounting seats 129 through the mount rubbers 130 by the bands 133, respectively.

The fuel tank 119 is vertically fixed by the bands 133, and is crosswise fixed by the upper surfaces 129a of the right and left mounting seats 129 inclined oppositely to each other. Thus the fuel tank 119 is securely fixed on the main pipes 111.

Further, a relatively thick mounting piece 134 is integrally formed on the front end surface of the fuel tank 119. The mounting piece 134 is fixed on a cross member 135 for connecting the upper ends of the right and left front pipes 108 to each other through a rubber piece 136 by a bolt 137. As shown in FIG. 17, a groove-like weight reducing portion 138 is provided on the root portion of the mounting piece 134, that is, the portion adjacent to the tank main body. The weight reducing portion 138 is formed by the projection provided on the blow molding die for the fuel tank 119. With the presence of the projection provided on the die, during formation of the thick mounting piece 134, it is possible to effectively prevent the shrinkage cavity 139 (V-groove) shown as the dotted line of FIG. 17 from being generated on the inner wall surface of the main body corresponding to the mounting piece 134.

In this embodiment, the rear portion of the fuel tank 119 is supported by the main pipes 111 by the bands 133 from the side, which eliminates the necessity of projecting such a member as the mounting piece 134 in the front portion at the back of the fuel tank 119 and of mounting the mounting piece 134 to the main pipes 111 and the seat rail pipes 112. Accordingly, there is generated enough space at the back of the fuel tank 119, and the air cleaner 118 is disposed as close to the fuel tank 119 as possible utilizing the above space. As a result, the devices and members can be easily disposed at the back of the air cleaner 118, or the capacity of the fuel tank 119 can be increased by the generated space.

Numeral 140 indicates an air intake port provided on the air cleaner 118. The air cleaner 118 is disposed such that the air intake port 140 is advanced in a recessed portion 141 (see FIG. 13) formed on the rear lower portion of the fuel tank 119. There has been described one embodiment in which the present invention was applied to the structure for supporting the fuel tank in the saddle-riding automatic four-wheel vehicle for rough road running; however, the fuel tank supporting structure may be applied to the usual motor-bicycle. Also, the disclosure is not limited to the fuel tank, but may be applied to the structure for supporting a vessel similar to the fuel tank. Further, in some cases, it is possible to generate the spaces in front of and behind the vessel by supporting the vessel from the sides by the above bands.

Eliminated is the necessity of providing the vessel fixtures on the frame members adjacent to at least one end portion of the vessel, thereby generating margin space. Accordingly, other devices can be disposed as close to the vessel as possible by using the margin space, which makes it possible to select the disposition of various devices and members in the saddle-riding vehicle with a greater discretion.

While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A saddle-riding vehicle comprising
a frame including right and left front pipes extending downwardly; reinforced right and left front suspension mounting structures including the lower portions of said right and left front pipes, respectively; right and left center pipes, each including a rearwardly extending portion and an upwardly extending portion, said right and left center pipes extending rearwardly from said right and left front suspension mounting structures, respectively; right and left straight main pipes extending from the upper portions of said right and left front pipes, respectively, to intermediate positions of said upwardly extending portions of said right and left center pipes, respectively; right and left seat rail pipes extending rearwardly from mid portions of said right and left main pipes, respectively, the upper ends of said upwardly extending portions of said right and left center pipes extending to mid portions on said right and left seat rails, respectively; and right and left reinforcing pipes extending between said right and left reinforced front suspension mounting structures, respectively, and said right and left main pipes, respectively, in longitudinal alignment with said right and left seat rail pipes, respectively.

2. The saddle-riding vehicle of claim 1, said right and left reinforced front suspension mounting structures being structural triangles including lower portions of said right and left front pipes, respectively, right and left second lower pipes extending from said right and left front pipes, respectively, to said right and left center pipes, respectively, and right and left front side pipes between said right and left front pipes, respectively, and said right and left lower pipes, respectively.

3. The saddle-riding vehicle of claim 1 further comprising
front cushion mounts and a rear cushion mount, said front cushion mounts being mounted to said frame on one side of said reinforcing pipes and said seat rail pipes and said rear cushion mount being mounted to said frame on the other side of said reinforcing pipes and said seat rail pipes.

4. The saddle-riding vehicle of claim 1 further comprising
an exhaust including an exhaust pipe extending rearwardly supported on said frame; a muffler; a connector between said exhaust pipe and said muffler;
a body mounted on said frame and including rear wheel fenders extending downwardly to form front walls, said connector being rearwardly of said front walls.

5. The saddle-riding vehicle of claim 1 further comprising
a seat mounted on said seat rails;
a fuel tank mounted on said frame forwardly of said seat and having a recess in the rear wall thereof;
an air cleaner having a suction duct extending to and opening into said recess.

6. The saddle-riding vehicle of claim 5 wherein said air cleaner further includes a case and a baffle plate mounted to said case and extending below the lower side of said suction duct.

7. The saddle-riding vehicle of claim 1 further comprising
a vessel positioned on said main pipes and including hooks on either side thereof;
resilient elements on said main pipes and extending in tension to said hooks, respectively.

* * * * *